(12) United States Patent
Naoumenko et al.

(10) Patent No.: US 7,553,536 B1
(45) Date of Patent: Jun. 30, 2009

(54) LAMINATED GLAZING WITH HIGH CRASH TEST RESISTANCE

(75) Inventors: Yves Naoumenko, Bray en Val (FR); Emmanuel Colin, Sully sur Loire (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 09/498,363

(22) Filed: Feb. 4, 2000

(30) Foreign Application Priority Data

Feb. 5, 1999 (FR) .................................... 99 01407

(51) Int. Cl.
 B32B 23/02 (2006.01)
 B32B 5/16 (2006.01)
 B32B 27/32 (2006.01)
 B32B 27/40 (2006.01)

(52) U.S. Cl. .................... 428/192; 428/195.1; 428/204; 428/220; 428/423.7; 428/426; 428/475.2

(58) Field of Classification Search ................. 428/192, 428/204, 423.1, 220, 195.1, 423.7, 426, 475.2
See application file for complete search history.

(56) References Cited

U.S. PATENT DOCUMENTS

| 4,551,372 | A | * | 11/1985 | Kunert ........................ 428/38 |
| 4,927,705 | A | * | 5/1990 | Syme et al. .................. 428/282 |
| 5,132,162 | A | * | 7/1992 | De Paoli ..................... 428/192 |
| 5,137,770 | A | * | 8/1992 | Rothe et al. ................. 428/192 |

\* cited by examiner

*Primary Examiner*—Jennifer McNeil
*Assistant Examiner*—Lawrence D Ferguson
(74) *Attorney, Agent, or Firm*—Oblon, Spivak, McClelland, Maier & Neustadt, P.C.

(57) ABSTRACT

A laminated glazing includes at least one sheet (1) and a second sheet (2) bound to each other by an intercalated adhesive layer (3). The first sheet (1) projects beyond the second sheet (2) to form an exposed edge. The intercalated adhesive layer (3) extends over an exposed portion of the edge of the first sheet (1), and the edge of the intercalated adhesive layer (3) is at least in part covered by an intermediate element (4) suited to bond between the glazing or its constitutive elements (3) and on the body (5) through the intermediary of a cement element. This glazing has use as an automobile windshield with high crash test resistance.

17 Claims, 1 Drawing Sheet

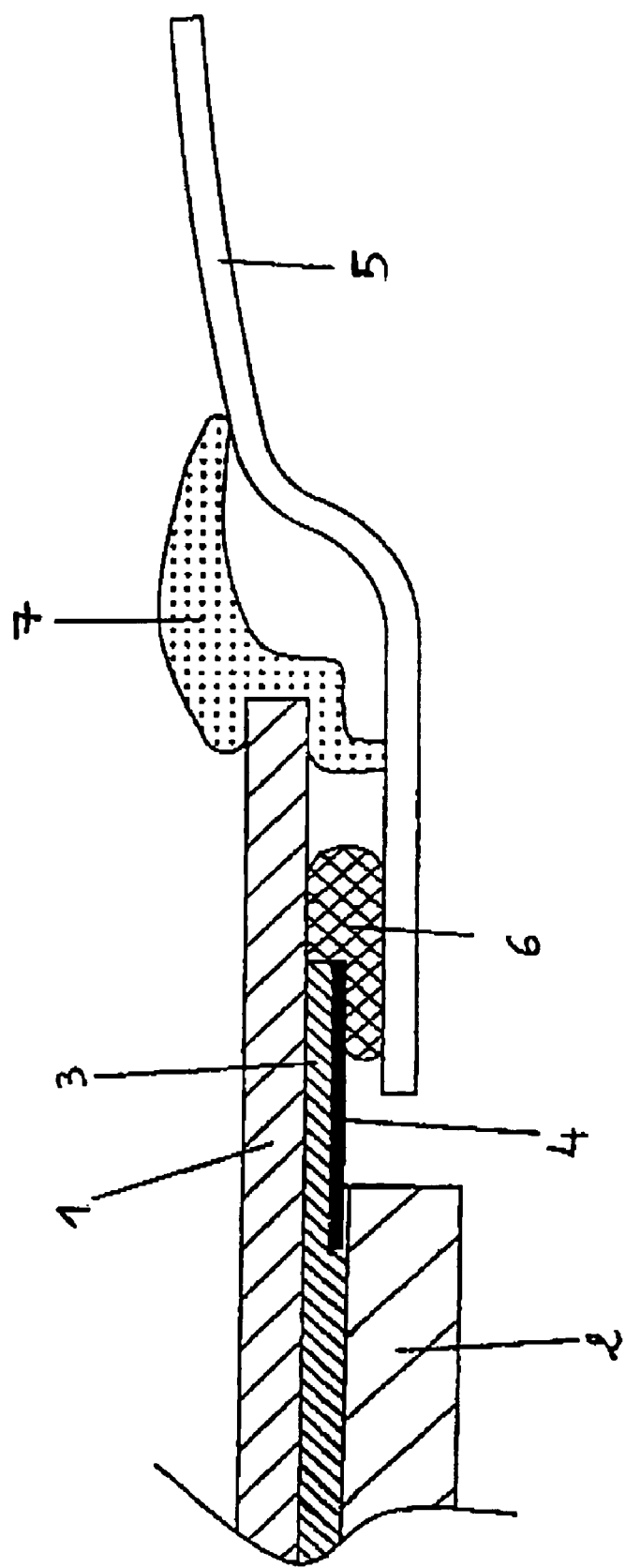

LAMINATED GLAZING WITH HIGH CRASH TEST RESISTANCE

BACKGROUND OF THE INVENTION

1. Field of the Invention

The present invention concerns a particular type of laminated glazings having numerous applications, specifically in construction, transportation vehicles or town furniture.

2. Description of the Related Art

These glazings can be defined as laminations of which at least one part of the surface has the requisite transparency, and which include sheets bound to one another by intercalated adhesive layers, the edges of at least two of these sheets being offset in relation to each other.

These laminated glazings used, for example, as automobile windshields, most often consist of two sheets of glass cemented by the intermediary of an adhesive layer of polyvinylbutyral (PVB). In general, the replacement of a monolithic sheet of glass by a laminated glazing satisfies well known safety requirements. Indeed, when a windshield breaks, the pieces of glass remain cemented on the intercalated adhesive, and thus the shattering of glass chips, in particular in the direction of the occupants, is diminished or eliminated. Other equally well known laminated transparent structures, in general more complex and thick, are for example designed for purposes of armor, anti-penetration (protection of goods), ballistic protection (bullet proof, anti-fragment). In addition to the materials previously mentioned, these structures can also include sheets of polymers such as polymethyl methacrylate (PMMA), polycarbonate (PC) and, as an adhesive, polyurethane (PU).

SUMMARY OF THE INVENTION

According to a feature of the laminated glazings of the invention, the edges of at least two of the constitutive sheets are offset in relation to each other. The offsetting of the edges frees a space on the periphery of the lamination. This space can be used for the insertion of elements such as connectors for electrical heating wire networks or antennae. The lamination thus presents a peripheral thinning, which allows it to be installed flush in a body contoured for flush installation of a monolithic sheet of glass of maximal but nevertheless smaller thickness. Thus it is possible, in configuring the bays of a frame, by stamping or similar techniques, to establish a uniform depth for the entire vehicle from the start.

Offsetting the edges of at least two constitutive sheets in a lamination nonetheless creates inferior crash test resistance when the vehicle strikes an obstacle under standardized conditions. The crash test resistance of the glazing is better if it does not break away from the frame to a significant extent on its periphery. It is important in the event of an accident that the windshield remain in its frame, thus offering protection to passengers from objects originating from outside the vehicle.

The present invention seeks to improve the crash test resistance of a laminated glazing presenting, among other things, at least two constitutive sheets with offset edges offering the advantages disclosed previously in the domain of body manufacture.

For this purpose, the invention has for an object a laminated glazing to be fitted upon a body, and comprising a first sheet; a second sheet, wherein the first sheet is offset in relation to the second sheet to form an exposed edge portion of the first sheet; an intercalated adhesive layer binding said second sheet to said first sheet, wherein the intercalated adhesive layer extends over a portion of at least the exposed edge portion of the first sheet; an intermediate element at least partially covering the intercalated adhesive layer at said exposed edge; and an cement element adhered at least partly to said intermediate element for securing the glazing to a body. This permits reinforcing the connection of the glazing to the frame, in particular in shock situations.

The first sheet is advantageously a float glass, possibly tempered, annealed or chemically reinforced as a function of the properties desired for its use. The advantage in the choice of float glass are its optical properties and its rigidity. These properties also render the use of these materials usable for constructing the second sheet. Nonetheless, the second sheet can also consist of transparent polymers such as polycarbonate (PC) or polymethyl methacrylate (PMMA).

Materials which can be used for the intercalated adhesive layers are the usual types of adhesives in this type of application. One can mention polyvinylbutyral (PVB) when the second sheet is of glass, and polyurethane (PU) when it is of polycarbonate (PC), the polymers PVB and PC being scarcely compatible. The cement is likewise conventional, for example, polyurethane (PU).

Of course, the laminated glazing of the invention can also include the usual functional layers or laminates: a hydrophobe/oleophobe or hydrophile/oleophile, possibly photocatalytic and anti-smear on the outside; a reflecting, or on the contrary, an anti-reflecting layer or laminate, a laminate with a thermal effect, or an anti-solar laminate limiting the transmission of solar radiation to the interior of a building or a vehicle, or a low emission laminate limiting the transmission of heat which has accumulated in the interior of a building or vehicle toward a cold exterior, or a decorative layer.

A network of heating conductor wires or an antenna is capable of being embedded within the intercalated adhesive layer. A semiconductor film can likewise be intercalated in the lamination. This semiconductor film may be, for example, comprised by sub-stoichiometric and/or doped metallic oxides such as described in application FR 2 695 117: Indium oxide doped with tin (ITO), zinc oxide doped with indium (ZnO:In), fluorine (ZnO:F), aluminum (ZnO:Al) or tin (ZnO:Sn) and stannic oxide doped with fluorine ($SnO_2$:F). Stannic oxide doped with antimony (pentavalent or tetravalent), $SnO_2$:Sb, is added to this group of materials. These semiconductor films can be heated, and used for defrosting and defogging. They, moreover, present properties of infrared reflection, specifically of low emissivity.

Additional layers and sheets can be superimposed on the free surface of the second sheet. They may be a simple sheet of polycarbonate or a laminate, the free surface of which, after superimposition of the second sheet, is made of a sheet of polycarbonate. This laminate can furthermore include, for example, an alternation of sheets of glass and layers of PVB, as well as a layer of PU, the function of which is to adhere to the sheet of PC of the free surface. This type of structure is employed for purposes of ballistic protection in bulletproof and anti-fragment laminations.

According to a preferred embodiment of the invention, the edge of the intercalated adhesive layer is totally covered by the intermediate element. In fact, this latter has the function of protecting the adhesive against elements with which it is susceptible to come into contact, such as water.

Moreover, the adhesion of the cement element to the adhesive is weak and/or of low durability as the case may be, and covering the adhesive by the intermediate element permits remedying this by limiting or eliminating the assembly glue-adhesive interface.

The invention has two variants: The intermediate element can penetrate underneath the second sheet or not do so. The fact that the intermediate element penetrates beneath the second sheet has as a consequence a significant improvement in the crash test resistance of the glazing, as well as better protection of the adhesive against water and the like in the region of the edge of the second sheet. On the other hand, realizing this configuration is not very simple. This is why it might be preferable for the intermediate element not to penetrate beneath the second sheet inasmuch as improved crash test resistance, capable of satisfying various rules of national preference, can also be attained under these conditions.

Other characteristics which improve crash test resistance, include: the tensile strength of the intermediate element, determined by conformably to the standard ISO 527, is at least equal to 10,000 MPa, preferably 15,000 Mpa; and the adhesion of the intermediate element on the intercalated adhesive layer corresponds to an experimental measure of peeling at 90° of at least 5 daN/cm, preferably at least 7 daN/cm.

Advantageously, the intermediate element is impermeable to water against which it protects the adhesive layer. To this end, the porosity of the material which it comprises corresponds to a recovery at most equal to 30 g/day/m$^2$, preferably 18 g/day m$^2$ when this material is in the form of a 3 mm thick ply.

Two modes of fastening the laminated glazing of the invention to the body are preferred. According to the first, the cement element is in contact with the body, and with the intermediate element and the first sheet. In other words, the cement element is positioned on the portion of the edge of the adhesive layer covered by the intermediate element and also on the internal face oriented toward the center of the laminated glazing, of the edge of the first sheet. According to the second mode of fastening, the cement element is in contact with the intermediate element, but not with the first sheet.

Materials proving particularly appropriate for constituting the intermediate element are metals such as aluminum, stainless steel, or epoxy, phenolic, unsaturated polyester type resins containing reinforcement fillers, for example, glass fibers, organic fibers, namely fibers of carbon, of aromatic polyamide. Nonetheless, insulating materials which do not conduct electricity are preferable in the presence of functional electrical accessories, such as heating wire networks, in order not to disturb their functioning.

In other respects, the invention likewise has for its object the use of the laminated glazing described above as an automobile windshield presenting a high crash test resistance.

BRIEF DESCRIPTION OF THE DRAWING

The invention will now be illustrated with reference to the sole drawing which is a schematic representation in part section of a laminated glazing in accordance with the invention installed on a body.

DETAILED DESCRIPTION OF THE PREFERRED EMBODIMENT

The laminated glazing includes a first sheet of float glass (1) 6 mm thick and a second sheet (2) of the same material 12 mm thick. The first sheet (1) is larger than the second sheet (2) to leave an exposed edge of the first sheet. The sheets (1) and (2) are bound to each other by a layer (3) of PVB 1.14 mm thick, which layer at least partially covers the exposed edge.

An intermediate element (4) of epoxy resin reinforced by glass fibers 0.25 mm thick covers the entirety of the edge of the layer (3) at the exposed edge, in this case penetrating under the second sheet (2). The portion of the intermediate element (4) situated under the second sheet (2) is embedded in the layer (3).

The laminated glazing is attached in the vehicle body (5) by means of a polyurethane cement element (6) positioned on the intermediate element (4) and the inner face of the edge of the first sheet (1).

A sealing and aesthetic strip (7) of ethylene propylene dienic monomer elastomer (EPDM) covers the side of the first sheet (1) and the surface of the body (5).

According to a variant of this form of construction, a bulletproof and anti-fragment property is conferred to this glazing by replacing the second sheet (2) described above by a sheet of float glass 6 mm thick upon which one superimposes a sheet of polycarbonate 3 mm thick with the interposition of an adhesive layer of polyurethane.

The windshields thus constructed are much less likely, in case of accident, to break away from the bay of the frame to which they are attached than are windshields having two sheets with offset edges, but otherwise not in conformity with the invention.

The invention claimed is:

1. Laminated glazing to be fitted upon a body, comprising:
a transparent first sheet;
a transparent second sheet, wherein the first sheet is offset in relation to the second sheet to form an exposed edge portion of the first sheet;
an intercalated adhesive layer binding said second sheet to said first sheet, wherein the intercalated adhesive layer extends over a portion of at least the exposed edge portion of the first sheet;
an intermediate element at least partially covering the intercalated adhesive layer at said exposed edge; and
a cement element adhered at least partly to said intermediate element for securing the glazing to a body.

2. Laminated glazing according to claim 1, wherein the intercalated adhesive layer covering said exposed edge is totally covered by the intermediate element.

3. Laminated glazing according to claim 1, wherein the intermediate element does not penetrate under the second sheet.

4. Laminated glazing according to claim 1, wherein the intermediate element penetrates under the second sheet.

5. Laminated glazing according to claim 1, wherein the intermediate element is formed of a material having a tensile strength in conformity with the standard ISO 527.

6. Laminated glazing according to claim 1, wherein the intermediate element is formed of a material having a tensile strength at least equal to 10,000 MPa.

7. Laminated glazing according to claim 1, wherein the intermediate element is formed of a material having a tensile strength at least equal to 15,000 MPa.

8. Laminated glazing according to claim 1, wherein the porosity of the material constituting the intermediate element corresponds to a water recovery at least equal to 30 g/day/m$^2$ for a 3 mm thick intermediate element.

9. Laminated glazing according to claim 1, wherein the porosity of the material constituting the intermediate element corresponds to a water recovery at least equal to 18 g/day/m$^2$ for a 3 mm thick intermediate element.

10. Laminated glazing according to claim 1, wherein the cement element is adhered to both the intermediate element and the first sheet.

11. Laminated glazing according to claim 1, wherein the cement element is adhered to only the intermediate element.

12. Laminated glazing according to claim 1, wherein the intermediate element is formed from at least one material from the group consisting of aluminum and stainless steel.

13. Laminated glazing according to claim 1, wherein the intermediate element is formed from at least one material from the group consisting of an epoxy and a phenolic, unsaturated polyester resin containing reinforcement fillers.

14. Laminated glazing according to claim 13, wherein the reinforcement fillers are comprised of at least one material from the group consisting of glass fibers and organic fibers.

15. Laminated glazing according to claim 13, wherein the reinforcement fillers are comprised of at least one material from the group consisting of fibers of carbon and aromatic polyamide.

16. Laminated glazing according to claim 8, wherein the intermediate element is formed of an electrical insulator.

17. Laminated glazing according to claim 1, wherein the body is an automobile body.

* * * * *